United States Patent [19]

McCluer

[11] Patent Number: 5,031,372

[45] Date of Patent: Jul. 16, 1991

[54] MODULAR FRAME ASSEMBLY FOR MOUNTING GLASS BLOCKS

[76] Inventor: Steve McCluer, 1730 W. Coast Hwy., Newport Beach, Calif. 92663

[21] Appl. No.: 577,140

[22] Filed: Sep. 4, 1990

[51] Int. Cl.⁵ .............................................. B44F 1/06
[52] U.S. Cl. ..................................... 52/307; 52/308; 52/442; 403/403
[58] Field of Search .................... 52/307, 308, 442; 403/403

[56] References Cited

U.S. PATENT DOCUMENTS 4,610,901 9/1986 Linscott ................................. 52/307
4,774,793 10/1988 Mayer ..................................... 52/308

Primary Examiner—Richard E. Chilcot, Jr.
Assistant Examiner—Joanne C. Downs
Attorney, Agent, or Firm—Francis X. LaJacono

[57] ABSTRACT

A framework assembly that consists of a multiplicity of vertical and horizontal frame members that are interconnected in a locking arrangement to provide a plurality of sealed compartments that are formed within a peripheral framework wherein glass blocks are readily mounted to define a glass-block wall structure held together by the frame members without the need for cement grout.

11 Claims, 2 Drawing Sheets

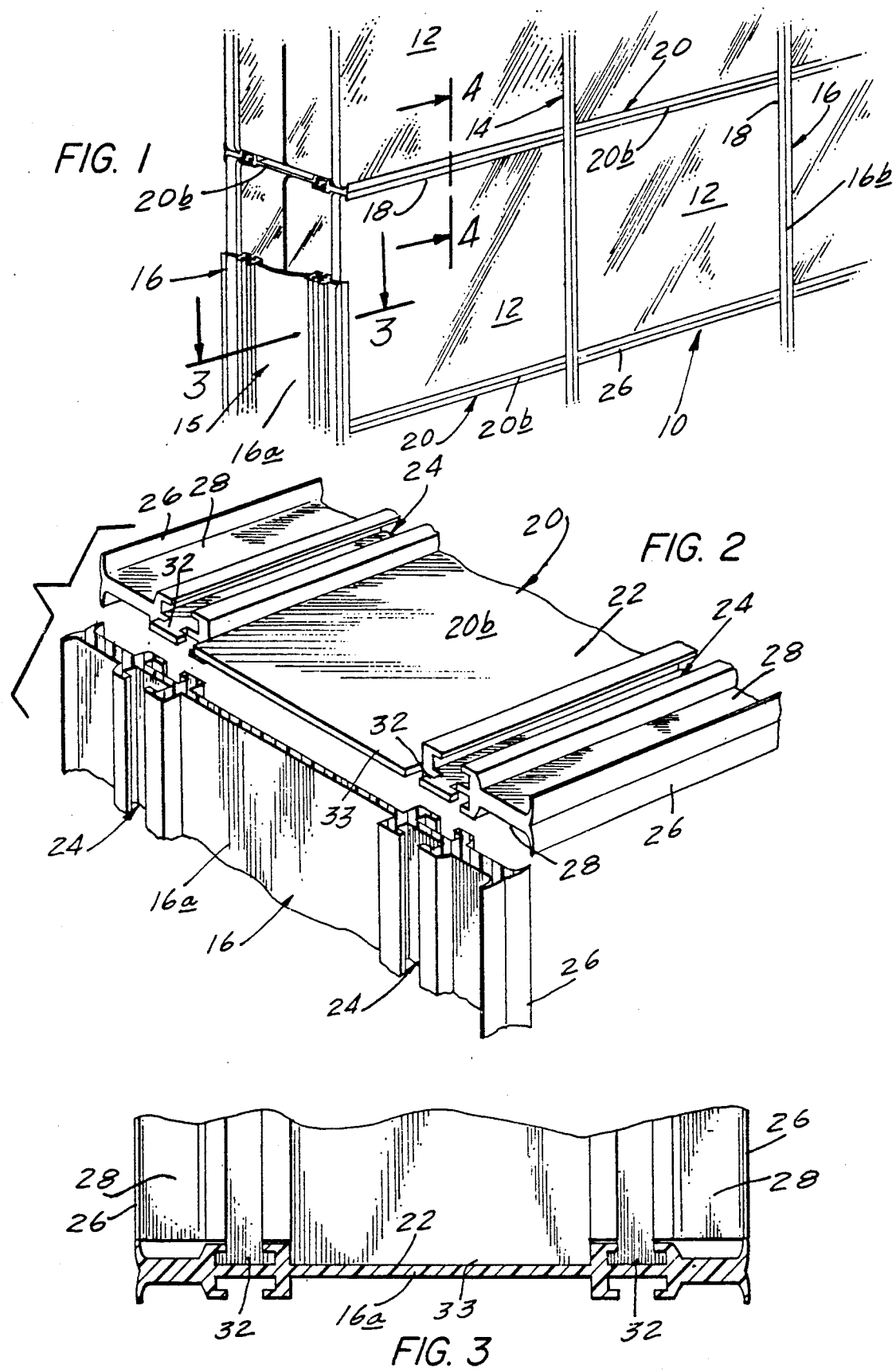

MODULAR FRAME ASSEMBLY FOR MOUNTING GLASS BLOCKS

BACKGROUND OF THE INVENTION

1. Field of the Invention

The present invention relates generally to the construction of glass blocks and the like and more particularly to a modular frame assembly that comprises a plurality of modular frame members that are assembled in an interconnecting arrangement to define a support structure for the construction of a glass block wall that does not require conventional cement grout material.

2. Description of the Prior Art

As is well known in the art, various problems and difficulties are encountered in providing suitable and efficient means for the installation and construction of glass-block wall structures. Many types of glass blocks have been tried over years and have been found lacking a simple solution whereby one can readily construct a sound wall quickly, without cracking or chipping the blocks, and further wherein the wall is assured of being assembled in a square and plumb manner. All of the known methods of assembling such glass block walls require the use of cement grout. When using cement grout, there is a problem in providing true horizontal and vertical course arrangement between each row of blocks. Spacing between each contiguous positioned block is still another problem. As is often the case, many glass block walls are installed after the structural wall has been erected having a specific opening left therein for later installation of the glass block assembly. Again, much time and effort are required for proper installation thereof. As examples of some known glass block assemblies, one may refer to any of the following U.S. patents.

There is disclosed in U.S. Pat. No. 2,227,842 to Milos Polivka a glass wall comprises individual glass blocks, each of which is recessed in its circumferential surface, and multiarmed anchoring elements located in planes angularly disposed relative to one another. The elements are adapted to be mounted near the intersections of each group of adjacent blocks, with their arms extending through the interstices between the adjacent blocks. There are means on the arms to engage the recesses of the blocks and bond them together to form a monolithic structure.

In U.S. Pat. No. 2,326,245 to Raymond Nichols et al, there is a wall structure comprising a series of panels, each panel being composed of a plurality of glass blocks, the panels being provided with a frame of perimeter bars, and the bars between adjacent edges of the panels being provided with stirrups comprising straps of metal and link-like key elements interconnecting the stirrups.

In U.S. Pat. No. 2,303,844 to Percy E. Knudsen, there is disclosed a mullion construction which comprises a pair of panels of glass blocks and a mullion between the two panels. The mullion comprises a core of an approximate I-beam section, with the flanges of the beam being approximately parallel the planes of the panels, providing a sheathing for the core. The sheathing comprises channel elements receiving packings against which the edges of the panels bear, the bottom portions of the channels being bent to provide groove portions and anchor elements embedded in the joints between the blocks in the panels and having projecting ends extending into the groove portions.

Other U.S. patents of interest are as follows;
U.S. Pat. No. 2,239,537 to William Owen.
U.S. Pat. No. 2,156,678 to Samuel Frank Cox.
U.S. Pat. No. 2,106,177 to Victor J. Hultquist.
U.S. Pat. No. 2,546,356 to John B. Boyd.

OBJECTS AND SUMMARY OF THE INVENTION

The present invention is defined as a modular frame assembly designed to provide an encasement for the erection of glass-block wall structures that overcomes the problems that now exist in the art of building glass block walls. The modular frame assembly comprises a plurality of perpendicular or upright frame members and a plurality of horizontal frame members that are assembled together with the perpendicular frame members. The horizontal frame members are of two types. One type is employed as an interposed spacer that is positioned between a pair of upright frame members on which a glass block is placed, and the other type horizontal frame member is arranged to establish the top and bottom frame members which extend the length of the finished frame assembly. Each upright frame member has a length that is approximately equal to the height of the wall formed by the glass blocks, with the horizontal spacer frame members having a length that is approximately equal to the length of the particular glass block that is to be assembled within the encasement defined by the frame assembly. All of the frame members are formed with a pair of back-to-back locking tracks that are arranged to receive respective locking tabs formed on the opposite ends of the horizontal spacer frame members.

Thus, the present invention has for an important object a provision wherein the frame assembly has only three basic frame members that are readily assembled without the use of tools. This is, each frame member is provided with respective interconnecting locking arrangements.

Another object of the present invention is to provide a novel modular frame assembly for mounting glass blocks that makes it simple, quick and easy to assemble the complete framework which has not been possible in the past.

Still another object of the invention is to provide a glass block encasement of the type that assures a square and plumb structure when completed.

It is still another object of the invention to provide a framework assembly that allows a glass block wall to be built without the use or need of cement grout material.

A further object of the invention is to provide a framework of this character that not only establishes an encasement structure but further provides a sealing system throughout the glass wall structure wherein the joints between the blocks are even throughout the vertical and horizontal seams thereof.

The characteristics and advantages of the invention are further sufficiently referred to in connection with the accompanying drawings, which represent two embodiments. Other variations may be made without departing from the principles disclosed and I contemplate the employment of any structures, arrangements or modes of operation that are properly within the scope of the appended claims.

BRIEF DESCRIPTION OF THE DRAWING FIGURES

With the above and related objects in view, the invention consists in the details of construction and combination of parts, as will be more fully understood from the following description, when read in conjunction with the accompanying drawings and numbered parts, in which:

FIG. 1 is a pictorial view of a bottom corner view of a glass block wall structure showing the outer upright frame member broken away for illustrative purposes;

FIG. 2 is an enlarged exploded view showing the locking member of the upright and horizontal spacer frame members;

FIG. 3 is an enlarged cross-sectional view taken substantially along line 3—3 of FIG. 1, but without the glass block positioned therein;

DESCRIPTION OF THE PREFERRED EMBODIMENT

Referring more particularly to FIG. 1, there is shown a pictorial view of a lower corner portion of a glass wall structure, generally indicated at 10, wherein the invention is depicted in its assembled form. This is, a plurality of glass blocks 12 are positioned vertically and horizontally to each other and are stacked in a juxtaposed fixed relation to each other by means of a modular frame assembly, designate at 14, that provides a peripheral encasement framework 15 which defines generally a quadrangle configuration of a glass wall structure 10.

Figure 5:
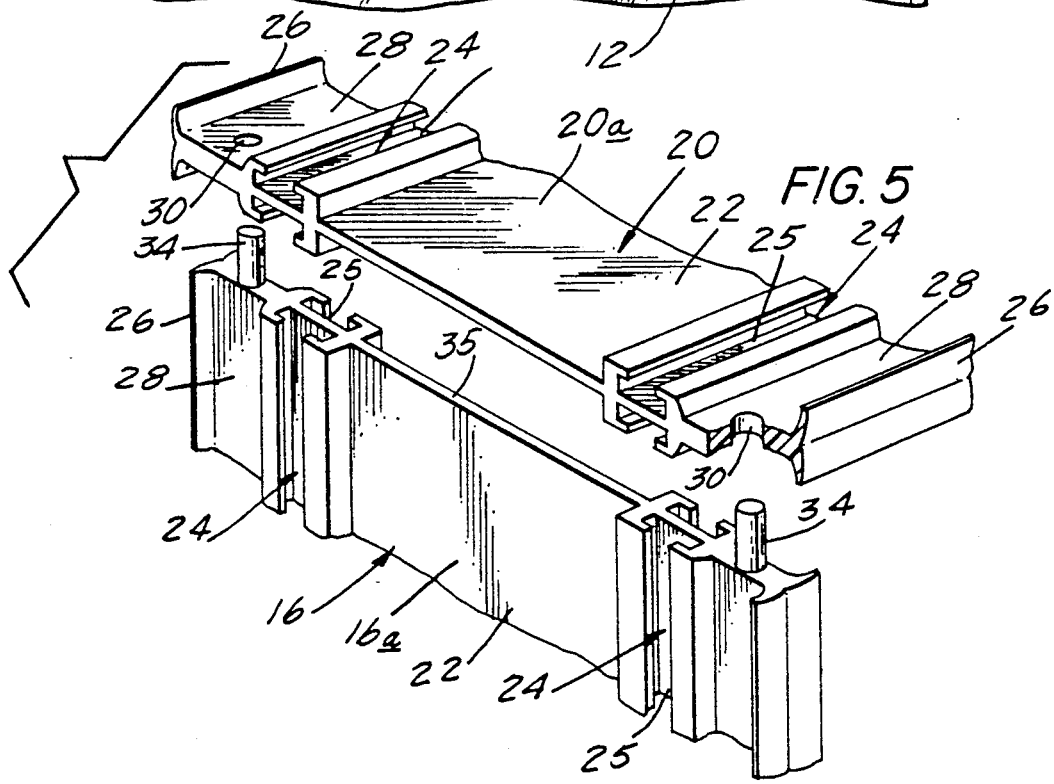
FIG. 5 is an enlarged exploded view of the connecting ends of the horizontal and vertical peripheral frame members to illustrate their respective interlocking ends.

The modular frame assembly 14 comprises a first set of elongated frame members that are positioned in an upright or perpendicular arrangement and a second set of frame members that are positioned in a horizontal arrangement. The upright frame members, generally designed at 16, are used to establish outer side frame members 16a which are part of the peripheral encasement framework 15, and inner frame members 16b which define fixed partitions that are positioned vertically between glass blocks 12. Both upright frame members 16a and 16b are identical in length and configuration, the length thereof being sufficient enough to cover the full length or height of the glass wall structure 10. The second set of frame members, generally indicated at 20, includes two types of horizontal frame members. One type of the horizontal frame members is used as part of the outer peripheral encasement framework 15 and comprises an elongated frame members 20a that is arranged to be positioned to cover the top and bottom rows of glass blocks 12, as shown in FIGS. 1 and 5. The top and bottom horizontal frame members 20a are formed having a length substantially sufficient enough to be connected to the corresponding ends of upright frame members 16a and 16b, the details of which will hereinafter be described.

The other horizontal frame member is designated generally at 20b and is designed to be used as a spacer between the upright members 16a and 16b, and will hereinafter be referred to as spacer frame member 20b. The spacer frame members 20b is formed such that each spacer frame member has the particular length of the glass blocks that are being used in the construction of the wall, and includes means on the outer ends thereof for attaching to the respective adjacent upright frame members 16. Accordingly, when modular framework is formed about the glass blocks, as illustrated in FIG. 1, a box-like receptacle or compartment 18 is defined in which each block 12 is mounted and secured therein.

The following is a description of how the wall is constructed together with a detailed description of each of the frame members. Starting with the top and bottom horizontal frame members 20a, there is provided a web portion 22 that extends the full length of the frame member, wherein a securing means is formed which is defined by a pair of securing tracks 24 that are spaced apart and extend throughout the length thereof. Each track 24, however, is in itself formed as a pair of securing tracks. That is, each track is provided with back-to-back, retaining flanged channels 25, also referred to as dual channels, whereby each web portion is formed having a securing means on both surfaces thereof. Web 22 extends outwardly from tracks 24 with each opposite longitudinal edge thereof being formed having a flange member 26 that helps to define outer longitudinal grooves 28, as illustrated in FIG. 5. Each groove 28 is formed having a plurality of aligned, equally spaced holes 30, which define part of the interconnecting means between horizontal frame members 20a and the connecting ends of the upright frame members 16a and 16b.

Referring now to FIG. 2, there is illustrated a partial perspective view of the intermediate spacer members 20b, wherein all space frame members 20b are also formed having securing means 24 which are identical to those formed in frame members 20a. Thus, for simplicity, the same reference characters will be employed for all of the identical parts or elements of the different frame members. In fact, all of the frame members 16 and 20 are formed as described above as having identical web portions 22, securing means 24, grooves 28 and flanges 26. However, horizontal frame members 20b are shorter in length with respect to the other types of frame members, whereby spacer frame members 20b are secured between the upright members 16.

Accordingly, the oppositely disposed ends of spacer frame members 20b are provided with hook-like tab members 32 that extend outwardly from the securing tracks 24 and are adapted to be slidably received in any one of the securing tracks of the various frame members. In FIG. 2 hook tabs 32 are shown spaced above the inner positioned tracks 24 of upright frame member 16a and ready for insertion therein.

In FIG. 3, which is a section view taken as 3—3 of FIG. 1, but without the glass block shown therein, hook tabs 32 are illustrated as being positioned in tracks 24. Note that end 33 of the central portion of web 22 abuts the central web of upright frame 16a. Thus, at this time frames 20b and 16a are secured together at right angles to each other which permits a glass block to be inserted therein, as seen in FIG. 1.

Figure 6:
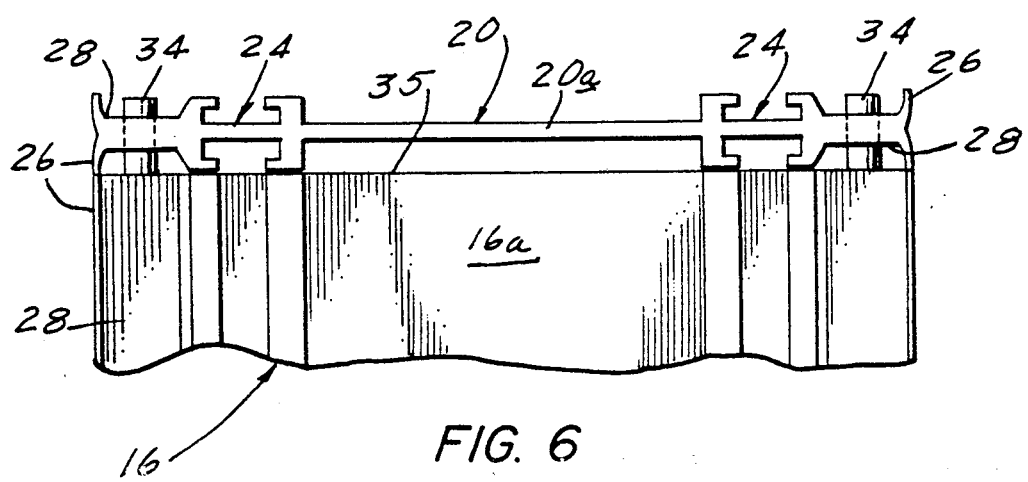
FIG. 6 is an enlarged end view of the two peripheral frame members in an interlocked position.

All of the upright frame members 16, and top and bottom frame members 20a, are adapted to be connected by means of holes 30 which are located in grooves 28 of frames 20a and by pins 34 that extend from the oppositely disposed ends 35 of frame members 16. This is, both arrangements of upright frame members 16a and 16b are provided with pins 34, whereby frame members 16, when connected to horizontal frame members 20a, will be positioned in a perpendicular and parallel arrangement to receive the glass blocks 12 therebetween. (See FIGS. 5 and 6.) Further, when all of the frame members are in place and the wall structure completed, the frame members 16 and 20 together provide a sealing means.

Figure 4:
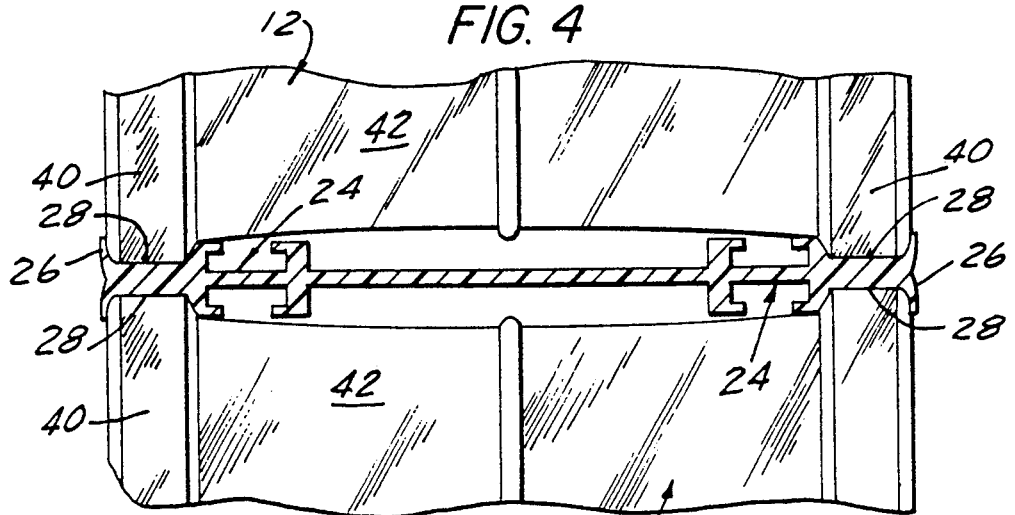
FIG. 4 is an enlarged cross-sectional view taken substantially along line 4—4 of FIG. 1, wherein an upper and lower glass block are positioned on the respective sides of the horizontal spacer frame member.

In constructing glass block walls using the present invention, it is suggested as an example that when the size of the glass wall is determined, a frame member 20a be positioned in place as a bottom encasement member followed by connecting the upright frame members 16 which are defined by both the upright outer encasement members 16a and the inner upright members 16b. Then, glass blocks 12 are inserted between the upright members 16, so as to define the first row of positioned blocks. Prior to the second row of blocks being positioned therein, a row of spacer members 20b is interposed between the upright members and locked at their opposite ends by inserting locking tabs 32 into the respective adjacent tracks 24 of the upright members 16, as illustrated in FIG. 1. Glass blocks are commonly formed having enlarged outer rims 40 which help to define a recessed body portion 42 (FIG. 4). As can be seen therein, the enlarged rims 40 suitably rest firmly within grooves 28, and the dual securing tracks 24 are readily positioned in the cavity provided by the oppositely disposed recessed bodies of the glass blocks 12. Accordingly, the same steps are made for inserting spacer frame members 20a and the glass blocks 12 until all of the necessary rows are completed. Thus, the last step is connecting the last horizontal frame member to complete the glass block wall. First, it should be understood that various methods may be employed in the construction of the frame members and blocks, and the above described method is only by way of one example. Further, it is important to note that because of the unique arrangement and design of the frame members there is no need for any cement grout material which is commonly used in such wall structures.

It may thus be seen that the objects of the present invention set forth herein, as well as those made apparent from the foregoing description, are efficiently attained. While preferred embodiments of the invention have been set forth for purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What I claim is:

1. A frame structure which defines a plurality of juxtaposed compartments wherein glass blocks are mounted to form a wall structure thereof:
   a plurality of upright frame members having connectable free ends formed thereon;
   a plurality of horizontal frame members being formed to connect in a secured relationship to said upright frame members;
   means for connecting a given number of said horizontal frame members to said upright frame members, whereby a peripheral encasement framework is defined, and wherein at least two of said horizontal frame members together with at least two of said upright frame members define said peripheral encasement;
   means for interlocking a plurality of said horizontal frame members to said upright frame members, whereby a multiplicity of compartments are formed to fixedly receive and support the glass blocks therein, wherein a multiplicity of said horizontal frame members define interlocking spacer frame members that are interposed between said upright frame members and interlocked therewith so as to hold said upright frame members in parallel relation to each other, wherein said upright frame members and said horizontal frame members define a means for sealing said blocks in the frame structure;
   wherein said interlocking means comprises:
   a pair of dual tracks formed longitudinally along said upright frame members; and
   a pair of hook members formed at opposite ends of said spacer frame members so as to be received in said tracks.

2. A frame structure as recited in claim 1, wherein said means for connecting said horizontal frame members that define a part of said peripheral encasement to said upright frame members comprises:
   a plurality of equally spaced aligned holes formed in said horizontal frame members; and
   a pair of connecting pins formed on the ends of said upright frame members and located thereon to be received in the corresponding holes disposed in said horizontal frame members.

3. A frame structure as recited in claim 1, wherein all of said frame members are formed having an elongated web member including flange members that define the outer edges thereof and grooves formed between said flange members and said dual tracks.

4. In combination, a frame assembly defining a plurality of compartments for mounting a plurality of juxtaposed blocks to define a partition comprising:
   a plurality of vertically disposed frame members;
   a plurality of horizontally disposed frame members;
   means for removably attaching said horizontal frame members to said upright frame members whereby said upright frame members are held in an upright position and in parallel relation to each other whereby said compartments are defined; and
   a plurality of blocks, each being mounted in said respective compartments formed by said interconnected frame members.

5. A combination of recited in claim 4, wherein an encasement is defined by at least a pair of horizontal frame members and at least a pair of vertical frame members.

6. A combination as recited in claim 4, wherein said attaching means includes means for fixedly connecting said vertical and said horizontal frame members together, whereby said vertical frame members are fixedly positioned in an upright parallel position with respect to said horizontal frame members.

7. A combination as recited in claim 6, wherein a multiplicity of horizontal frame members define spacers that are interposed longitudinally between said vertical frame members.

8. A combination as recited in claim 7, wherein said attaching means further includes means for interlocking said spacers to said vertical frame members.

9. A combination as recited in claim 8, wherein each of said frame members is formed having an elongated web member and oppositely disposed flanged edges, and wherein the opposite surface of each of said web member is formed having a pair of spaced apart channel members, wherein a parallel groove is formed between said flanged edges and said channel members.

10. A combination as recited in claim 9, wherein said locking means comprises a pair of interlocking tabs formed at each end of said spacer and arranged to be received in said channel members which define a track.

11. A combination as recited in claim 10, wherein said attaching means also includes a plurality of aligned holes formed in said horizontal frame members of said encasement, and a pair of pin members formed on the opposite ends of said vertical frame members arranged to be received in said holes.

* * * * *